(12) United States Patent
Abrol et al.

(10) Patent No.: US 10,697,318 B2
(45) Date of Patent: Jun. 30, 2020

(54) EFFICIENCY MAPS FOR TRACKING COMPONENT DEGRADATION

(71) Applicant: General Electric Company, Schenectady, NY (US)

(72) Inventors: Sidharth Abrol, Bangalore (IN); David Spencer Ewens, Greenville, SC (US); Prabhanjana Kalya, Hyderabad (IN); Samhitha Palanganda Poonacha, Bangalore (IN)

(73) Assignee: General Electric Company, Schenectady, NY (US)

( * ) Notice: Subject to any disclaimer, the term of this patent is extended or adjusted under 35 U.S.C. 154(b) by 740 days.

(21) Appl. No.: 15/404,903

(22) Filed: Jan. 12, 2017

(65) Prior Publication Data
US 2018/0195405 A1   Jul. 12, 2018

(51) Int. Cl.
| | | |
|---|---|---|
| F01D 21/00 | (2006.01) | |
| F02C 3/04 | (2006.01) | |
| F02C 6/18 | (2006.01) | |
| F01K 7/16 | (2006.01) | |
| G01M 15/14 | (2006.01) | |
| G01L 3/26 | (2006.01) | |
| F01K 23/10 | (2006.01) | |

(52) U.S. Cl.
CPC .............. *F01D 21/003* (2013.01); *F01K 7/16* (2013.01); *F01K 23/10* (2013.01); *F01K 23/101* (2013.01); *F02C 3/04* (2013.01); *F02C 6/18* (2013.01); *G01L 3/26* (2013.01); *G01M 15/14* (2013.01); *Y02E 20/16* (2013.01)

(58) Field of Classification Search
USPC ......................................................... 702/33
See application file for complete search history.

(56) References Cited

U.S. PATENT DOCUMENTS

| | | | |
|---|---|---|---|
| 4,270,503 A | 6/1981 | Pomerantz | |
| 5,445,027 A * | 8/1995 | Zorner | G01N 29/14 73/593 |
| 6,370,935 B1 | 4/2002 | He et al. | |

(Continued)

FOREIGN PATENT DOCUMENTS

| | | |
|---|---|---|
| EP | 1122625 A1 | 8/2001 |
| EP | 1712767 B1 | 1/2008 |

OTHER PUBLICATIONS

Lu, L., and Pope, S. An improved algorithm for in situ adaptive tabulation. Journal of Computational Physics [online], Sep. 2008 [retrieved on Sep. 28, 2019]. Retrieved from the Internet: <http://citeseerx.ist.psu.edu/viewdoc/download?doi=10.1.1.477.2428&rep=rep1&type=pdf> pp. 361-368. (Year: 2008).*

*Primary Examiner* — Paul D Lee
(74) *Attorney, Agent, or Firm* — Fletcher Yoder, P.C.

(57) ABSTRACT

A non-transitory computer readable medium stores instructions that are executed by a processor of a monitoring that when executed, the processor receives a state of at least one operational parameter of the turbomachinery. Then, the processor determines whether the state is within a region of accuracy of a stored record of a stored state stored in the memory. When the state is within the region of accuracy, the processor determines at least one operating condition from the stored record. Alternatively, when the state is not within the first region of accuracy, the processor stores the state as a new record in the memory.

20 Claims, 4 Drawing Sheets

(56) References Cited

U.S. PATENT DOCUMENTS

| | | | |
|---|---|---|---|
| 6,609,085 B1* | 8/2003 | Uemura | G05B 19/418 |
| | | | 702/113 |
| 6,823,675 B2 | 11/2004 | Brunell et al. | |
| 7,139,687 B2 | 11/2006 | Eryilmaz et al. | |
| 7,742,904 B2 | 6/2010 | Healy et al. | |
| 7,801,711 B2 | 9/2010 | Hayashi | |
| 7,930,153 B2 | 4/2011 | Eryilmaz et al. | |
| 8,024,164 B1 | 9/2011 | Eryilmaz et al. | |
| 8,566,375 B1 | 10/2013 | Kerr-Delworth et al. | |
| 9,256,224 B2* | 2/2016 | Herzog | G05B 23/0283 |
| 2012/0053851 A1* | 3/2012 | Baller | F03D 1/0658 |
| | | | 702/34 |
| 2012/0111114 A1* | 5/2012 | Emde | F04D 15/0088 |
| | | | 73/579 |
| 2013/0327053 A1 | 12/2013 | Mitchell et al. | |
| 2014/0020400 A1 | 1/2014 | Ceccherini et al. | |
| 2015/0185716 A1 | 7/2015 | Wichmann et al. | |
| 2016/0330225 A1* | 11/2016 | Kroyzer | G06F 21/552 |
| 2017/0306740 A1* | 10/2017 | Song | E21B 47/024 |
| 2017/0306742 A1* | 10/2017 | Xue | E21B 47/024 |
| 2017/0308801 A1* | 10/2017 | Cai | G05B 23/0229 |

* cited by examiner

EFFICIENCY MAPS FOR TRACKING COMPONENT DEGRADATION

BACKGROUND

The subject matter disclosed herein relates to efficiency maps for power generation systems, and more particularly, to building efficiency maps for a bottoming cycle of a combined cycle power plant.

In power generation systems, thermodynamic cycles may refer to processes that use heat or other forms of energy to generate power. For example, combined cycle power plants may include a gas turbine cycle that generates power from fuel and a steam cycle that generates power from excess heat in the gas turbine cycle. The cycles may operate in conjunction with each other to produce power at a higher overall efficiency than systems that do not include combined cycle power. The components of the steam turbine and/or the gas turbine may degrade over time. However, because power generation of the steam turbine and the gas turbine is combined to rotate the shaft, it may be difficult to diagnose which part of the combined cycle power plant has decreased in performance and caused the degradation in performance of the power generation system.

BRIEF DESCRIPTION

Certain embodiments commensurate in scope with the originally claimed disclosure are summarized below. These embodiments are not intended to limit the scope of the claimed disclosure, but rather these embodiments are intended only to provide a brief summary of possible forms of the disclosure. Indeed, embodiments may encompass a variety of forms that may be similar to or different from the embodiments set forth below.

In a first embodiment, a non-transitory computer readable medium stores instructions that are executed by a processor of a monitoring system of turbomachinery having a combined cycle. When the instructions are executed, the processor receives a state of at least one operational parameter of the turbomachinery. Then the processor determines whether the state is within a region of accuracy of a stored record of a stored state stored in the memory. When the state is within the region of accuracy of the stored state, the processor determines at one or more operating condition from the stored record. Alternatively, when the state is not within the region of accuracy of the stored state, the, the processor stores the state as a new record in the memory.

In a second embodiment, a turbine system contains a processor and memory storing instructions that causes a processor to receive a state of at least one operational parameter of the turbine system and compare the state to one or more stored states in a binary tree. For each of the one or more stored states, the instructions cause the processor to determine whether the state is within a region of accuracy of a stored record of a respective stored state of the one or more stored states. When the state is within the region of accuracy of the stored record, the processor interpolates one or more operating conditions for the turbine system from the stored record. Alternatively, when the state is not within any respective region of accuracy of the one or more stored states, the processor stores the state as a new record.

In a third embodiment, a method for monitoring the operation of a combined cycle system receives a state containing at least one operational parameter of the combined cycle system. Then the state is compared to one or more stored states in a binary tree in memory to determine whether the state is within a region of accuracy of a stored record of respective stored states. When the state is within the region of accuracy of the stored record, the method includes interpolating one or more efficiencies of a steam cycle of the combined cycle system from the stored record. Lastly, the processor classifies the inefficiencies.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
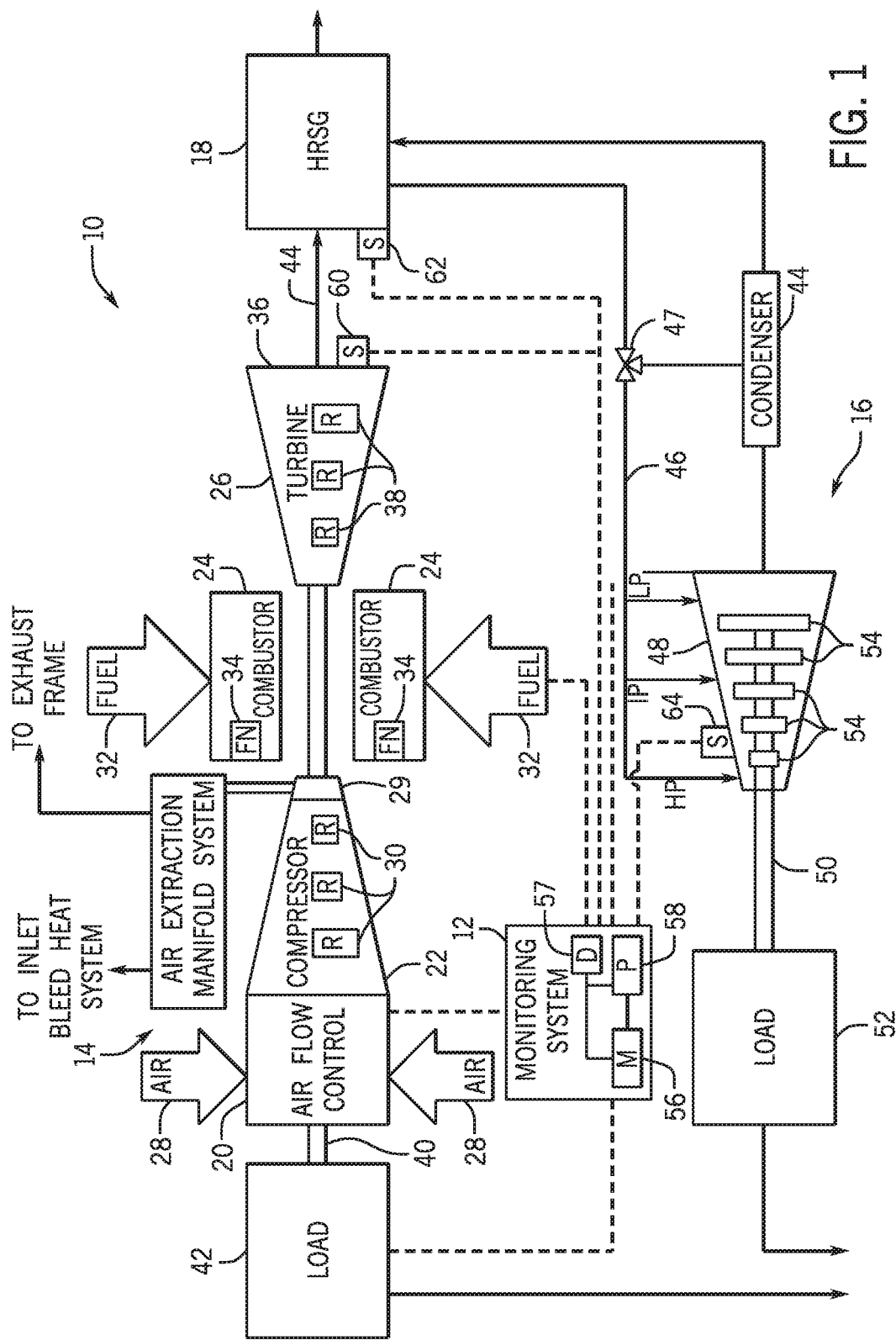
FIG. 1 is a block diagram of a combined cycle power plant (CCPP) having a monitoring system that monitors an operation performed by a bottoming cycle of the CCPP, in accordance with an embodiment.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure are related to building efficiency maps for a bottoming cycle of combined cycle power plants. It should be appreciated that in further embodiments, the same systems and process discussed below may be applicable to a topping cycle. For example, efficiency maps may be used to track the efficiencies of the components of a gas turbine (e.g., compressor, combustor, turbine components, etc.) to identify degradation. Combined cycle power plants may include a gas turbine and a steam turbine that operate in conjunction with each other to produce mechanical and electrical energy that powers one or more loads. For example, the gas turbine may receive a fuel and an oxidant, such as air, and combust the fuel and the oxidant to generate mechanical energy to rotate a shaft of a generator that is used to provide power one or more loads.

Further, the steam turbine may receive steam from heat recovery steam generator (HRSG) using exhaust of the gas turbine, to rotate one or more turbine blades to generate mechanical energy to again rotate a shaft of a generator and provide power the one or more loads. In some embodiments, the gas turbine and the steam turbine may be coupled to a single shaft to provide the mechanical energy to one generator, which outputs electrical energy to the one or more loads.

Due to the combined nature of the gas turbine and steam turbine, it may be difficult to determine contributions of the steam turbine and/or the gas turbine to the total power output of the combined cycle power plant. Further, due to various conditions (e.g., degradation over time, ambient temperatures of the combined cycle power plant, etc.), it may be beneficial to build a map of many efficiencies to track component degradation and discern what parts of the combined cycle power plant are causing decreases in efficiency.

A system and method for building efficiency maps for various conditions of a combined cycle power plant to track the degradation of one or more of components in power plants is described below. Building efficiency maps in binary trees using an algorithm called in situ adaptive tabulation (ISAT). This efficiency map building may utilize a processor operatively coupled to a memory to build the efficiency map. Namely, the processor may use a mapping function based on an adaptive lookup table, which is built online or in situ to create a database as the plant is operating. The database may include a database of baseline efficiencies. For example, the processor may receive data of any operation parameters relevant to CCPP, such as the gas turbine (e.g., exhaust gas flow, exhaust gas temperature, ambient temperature, condenser pressure, etc.). Moreover, to assemble the database, the system identifies a state, more specifically a state of efficiency, which is a function of the operation parameters, and if the given state is not in the database, the operation parameters corresponding to that given state are stored to the database. The processor establishes acceptable threshold values of the baseline efficiencies corresponding to the various states in the database. For example, the processor may determine the threshold by using a bottoming cycle performance (BCP) model. Once the database has been assembled, a first efficiency of the steam turbine efficiencies, which is a function of one or more real-time operational parameters is compared against the corresponding baseline efficiency state which is a function of the same operating parameters that have been previously stored in the database. Furthermore, the first efficiency of the steam turbine efficiencies is then compared to the baseline efficiencies. The processor may provide an indication of a decrease in efficiency of the process if the first efficiency is below the threshold of the baseline efficiencies. Further, the processor may identify one or more parts that may cause the decrease in efficiency of the process. Moreover, in some embodiments, the processor may adjust operations of the combined cycle power plant based on the identified causes of the decreases in efficiency.

By way of introduction, FIG. 1 is a block diagram of an embodiment of a combined cycled power plant 10 with a monitoring system 12 that may monitor operations performed by the combined cycle power plant 10. In some embodiments, the monitoring system 12 may be incorporated into a controller of the combined cycle power plant to control the operations performed by the combined cycle power plant 10, increasing power output or decreasing power output from a gas turbine system 14 and/or a steam turbine system 16.

Keeping this in mind, the combined cycle power plant (CCPP) 10 includes the monitoring system 12, the gas turbine system 14, the steam turbine system 16, and a heat recovery steam generator (HRSG) 18. In operation, the gas turbine system 14 combusts a fuel-air mixture to create torque that drives a load (e.g., an electrical generator). In order to reduce energy waste, the combined cycle power plant 10 uses the thermal energy in the exhaust gases to heat a fluid and create steam in the HRSG 18. The steam travels from the HRSG 18 through a steam turbine system 16 creating torque that drives a load (e.g., an electrical generator). Accordingly, the CCPP 10 combines the gas turbine system 14 with steam turbine system 16 to increase power production while reducing energy waste (e.g., thermal energy in the exhaust gas).

The gas turbine system 14 includes an airflow control module 20, compressor 22, combustor 24, and turbine 26. In operation, an oxidant 28 (e.g., air, oxygen, oxygen enriched air, or oxygen reduced air) enters the turbine system 14 through the airflow control module 20, which controls the amount of oxidant flow (e.g., airflow). The airflow control module 20 may control airflow by heating the oxidant flow, cooling the oxidant flow, extracting airflow from the compressor 22, using an inlet restriction, using an inlet guide vane, or a combination thereof. As the air passes through the airflow control module 20, the air enters the compressor 22. The compressor 22 pressurizes the air 28 in a series of compressor stages (e.g., rotor disks 30) with compressor blades. After the air 28 is pressurized, the pressurized air may reside in a compressor discharge chamber 29 before the compressed air exits the compressor 22.

As the compressed air exits the compressor 22, the air enters the combustor 24 and mixes with fuel 32. The turbine system 14 may use liquid or gas fuel, such as natural gas and/or a hydrogen rich synthetic gas, to run the turbine system 14. For example, the fuel nozzles 34 may inject a fuel-air mixture into the combustor 24 in a suitable ratio for optimal combustion, emissions, fuel consumption, and power output. As depicted, multiple fuel nozzles 34 intakes the fuel 32, mixes the fuel 32 with air, and distributes the air-fuel mixture into the combustor 24. The air-fuel mixture combusts in a combustion chamber within combustor 24, thereby creating hot pressurized exhaust gases. The combustor 24 directs the exhaust gases through a turbine 26 toward an exhaust outlet 36. As the exhaust gases pass through the turbine 26, the gases contact turbine blades attached to turbine rotor disks 38 (e.g., turbine stages). As the exhaust gases travel through the turbine 26, the exhaust gases may force turbine blades to rotate the rotor disks 38. The rotation of the rotor disks 38 induces rotation of shaft 40 and the rotor disks 30 in the compressor 22. A load 42 (e.g., electrical generator) connects to the shaft 40 and uses the rotation energy of the shaft 40 to generate electricity for use by the power grid.

As explained above, the combined cycle power plant 10 harvests energy from the hot exhaust gases exiting the gas turbine system 14 for use by the steam turbine system 16 or a boiler. Specifically, the CCPP 10 channels hot exhaust gases 44 from the turbine system 14 into the heat recovery steam generator (HRSG) 18. In the HRSG 18, the thermal energy in the combustion exhaust gases converts water into hot pressurized steam 46. The HRSG 18 releases the steam in line 46 for use in the steam turbine system 16. Further, the steam in line 46 may be provided at various locations of the steam turbine 16 depending on pressure of the steam. For example, high pressure (HP) steam may be received by the steam turbine 16 at a first location, intermediate pressure (IP) steam may be received by the steam turbine 16 at a second location, and low pressure (LP) steam may be received by the steam turbine 16 at a third location. Although three locations are illustrated in FIG. 1, any suitable number of locations may be used to feed the steam from the HRSG 18 into the steam turbine 16.

The steam turbine system 16 includes a turbine 48, shaft 50, and load 52 (e.g., electrical generator). As the hot pressurized steam in line 46 enters the steam turbine 48, the steam contacts turbine blades attached to turbine rotor disks 54 (e.g., turbine stages). As the steam passes through the turbine stages in the turbine 48, the steam induces the turbine blades to rotate the rotor disks 54. The rotation of the rotor disks 54 induces rotation of the shaft 50. As illustrated, the load 52 (e.g., electrical generator) connects to the shaft 50. Accordingly, as the shaft 50 rotates, the load 52 (e.g., electrical generator) uses the rotation energy to generate electricity for the power grid. As the pressurized steam in line 46 passes through the turbine 48, the steam loses energy (i.e., expands and cools). After exiting the steam turbine 48, the steam exhaust 51 enters a condenser 49 before being routed back to the HRSG 18, where the steam is reheated for reuse in the steam turbine system 16.

Generally, the monitoring system 12 may include a memory 56, display 57, and a processor 58. The memory 56 includes tangible, non-transitory, computer-readable media that stores instructions and steps written in software code. The display 57 may include a liquid crystal display (LCD), an electroluminescent display (ELD), a cathode ray tube display (CRT), and/or a light emitting diode (LED) display among many other display options for relaying information about the CCPP 10. The processor 58 executes the stored instructions in response to data received from the CCPP 10. More specificallly, the monitoring system 12 may be incorporated in a controller that controls and communicates with various components in the CCPP 10 in order to flexibly control the loading of the gas turbine system 14, and thus the loading of the steam turbine system 16. As illustrated, the controller may control the airflow control module 20, the intake of fuel 32, and valve(s) 47; and the monitoring system 12 may communicate with load 42.

The combined cycle power plant 10 may also include various sensors for detecting and/or deriving various conditions within or around the combined cycle plant 10. For example, the sensors may measure temperatures at various locations using various temperature sensors, such as exhaust gas temperature sensor 60, HRSG steam temperature sensor 62, and steam turbine metal temperature sensor 64, and the like. Additionally or alternative, the sensors of the combined cycle power plant 10 may pertain to other operating parameters, such as pressure, vibration, flow rates, knocks within the combined cycle power plant 10, valve detection (open or closed), speed, stress or strain, and/or other suitable parameters that may be measured indicating operation of the combined cycle power plant 10.

In operation, the controller of the CCPP 10 may control the airflow control module 20 and the consumption of fuel 32 to change the loading of the gas turbine system 14 and thereby the loading of CCPP 10 (i.e., how the CCPP 10 increases electrical power output to the grid). Specifically, the controller adjusts a mass flow rate and temperature of the exhaust gas 44, which controls how rapidly the HRSG 18 produces steam for the steam turbine system 16, and therefore, how quickly the CCPP 10 produces electrical power using loads 42 and 52. For example, when the controller increases the airflow with the airflow control module 20, it increases the amount of airflow flowing through the compressor 22, the combustor 24, and the turbine 26. The increase in airflow increases the mass flow rate of the exhaust gas, and thus increases the torque of the shaft 40. Moreover, the increase in the mass flow rate of the exhaust gas 44 increases the amount of thermal energy available for the HRSG 18 to produce steam (i.e., more exhaust gas is flowing through the HRSG 18). An increase in steam production by the HRSG 18 reduces startup time for the steam turbine system 16 and thus increases electrical output from the load 52.

Although the monitoring system 12 has been described as having the memory 56, display 57 and the processor 58, it should be noted that the monitoring system 12 may include a number of other computer system components to enable the monitoring system 12 to control the operations of the CCPP 10 and the related components. For example, the monitoring system 12 may include a communication component that enables the monitoring system 12 to communicate with other computing systems. The monitoring system 12 may also include an input/output component that enables the monitoring system 12 to interface with users via a graphical user interface or the like.

The CCPP 10 includes a combination of cycles to generate power. That is, the CCPP 10 may include a cycle of the gas turbine 14, referred to as a topping cycle, and a cycle of the steam turbine 16, referred to as a bottoming cycle. Although FIG. 1 depicts the shaft 50 of the steam turbine 16 as separate from the shaft 40 of the gas turbine 14, this is meant to be illustrative to show each of the cycles of the CCPP 10. The CCPP 10 may include a single shaft between the gas turbine 14 and the steam turbine 16. As described below, the single shaft may be referred to with reference numbers 40 and 50. To assess performance of the bottoming cycle, a bottoming cycle performance (BCP) model may be used to determine the contribution of power from the steam turbine 16 to the CCPP 10 (e.g., rotational energy delivered to the single shaft).

As the gas turbine 14 and the steam turbine 16 share the single shaft 40 and 50, the monitoring system 12 may utilize a BCP model to determine the contribution of power from the steam turbine 16 to the CCPP 10. The BCP model is a thermodynamic model which uses the estimated available operational parameters related to energy producing variables of the gas turbine 14 such as, but not limited to exhaust flow rate, gas turbine exhaust temperature, ambient temperature, and condenser pressure. After obtaining these operational parameters, the following conditions are mapped as a function of the aforementioned operational parameters: HRSG high pressure intermediate pressure (HPIP) efficiency, HRSG low pressure (LP) efficiency, and steam turbine efficiency, among others. Each of the efficiencies may be determined by inputting measurements of the CCPP 10 into the BCP model.

For example, the processor 58 may utilize the BCP model to estimate power output of the steam turbine 16 based on exhaust measurements coming from the gas turbine 14. Further, the BCP model may estimate efficiency of various aspects of the steam turbine 16 and HRSG 18. For instance, the BCP model may estimate the HRSG HPIP efficiency of power generated from the steam 46 entering at the HP and the IP locations of the steam turbine 16, HRSG LP efficiency of power generated from the steam 46 entering at the LP location of the steam turbine 16, and the like, using measurements of one or more operating parameters of the steam turbine 16. The monitoring system 12 may receive signals from the steam turbine 16, the HRSG 18, the gas turbine 14, and the like, indicating measured flows, pressures, temperatures, and the like. The efficiencies of the various aspects of the steam turbine 16, gas turbine 14, and the like are stored as baseline efficiencies, and then that real time values corresponding to each of these baseline efficiencies are compared against one another. The process of storing these baseline efficiencies is described in detail below.

In some embodiments, the monitoring system 12 may be located proximate to the CCPP 10 or may be a cloud-based service. Further, the monitoring system 12 may include models that estimate efficiencies, such as HRSG HPIP efficiency, based on measurements, such as HP flow. The monitoring system 12 may then identify the one or more parts that have degraded compared to prior efficiencies that have been previously determined earlier.

The sensors 60, 62, and 64 of processor 58 from FIG. 1 may relay system input parameters such as measured flows, pressures, temperatures, and/or other suitable measured input parameters, from the HRSG 18, steam turbine 16, gas turbine 14, and/or other components of the CCPP 10 suitable for analysis. For example, the processor 58 may receive measured flows of steam 46 entering the turbine 48 of the steam turbine 16 system as input parameters.

Figure 2:
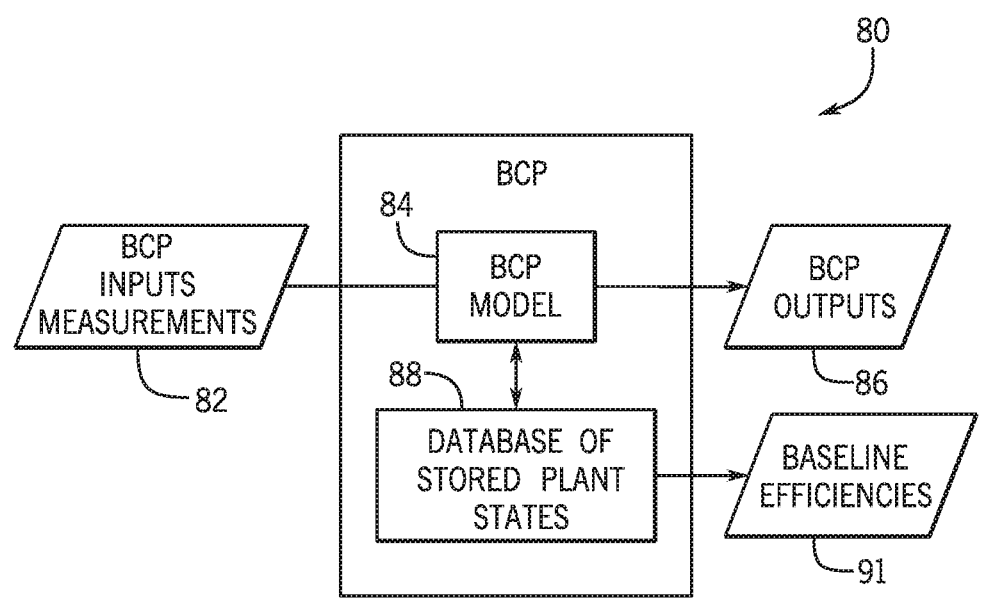
FIG. 2 is a flow diagram of a process performed by the monitoring system of FIG. 1, in accordance with an embodiment.

Turning now to FIG. 2, a flow diagram of an embodiment of a process 80 performed by the processor 58 of the monitoring system 12. The processor 58 of FIG. 1, executes an algorithm called in situ adaptive tabulation (ISAT), provided in the BCP model 84, using the input parameters acquired by the sensors 60, 62, and 64, provided as BCP input measurements 82 to propagate a binary tree of stored mappings of input-output records that make up the database of stored states 88. In other words, inside the BCP model 84, the input parameters are received, and a database of mappings of input-output records called states are assembled using the ISAT algorithm into binary trees that make up the database of stored states 88. The baseline efficiencies 91 are the efficiencies outputted by the stored plant states 88, based on either the interpolation of the stored plant states 88 or the addition of a new state to the database of stored plant states 88, as discussed in detail below in the discussion of FIG. 4. Meanwhile, those states not assembled into the database of stored state 88 are outputted from the system as provided via output BCP 86. As such, the aforementioned states are made of the inputs recorded by the sensors and their corresponding output conditions (i.e. efficiencies).

The BCP input measurements 82 may include operation parameters such as exhaust flow rate over the turbomachinery, gas turbine 14 exhaust temperature, ambient temperature around the turbomachinery, condenser 49 pressure, and/or other suitable operation parameters. The BCP outputs 86, which are functions on the BCP input measurements 82, may include the efficiencies of the HRSG 18, the efficiency of the steam turbine 16, and the like. The method regarding how the database of stored states 88 is assembled, how the BCP output conditions 86 are created, and the process whereby the processor determines whether a condition is stored in the database of stored state 88 or BCP output is discussed in detail below in the discussion regarding FIG. 4.

Figure 3:
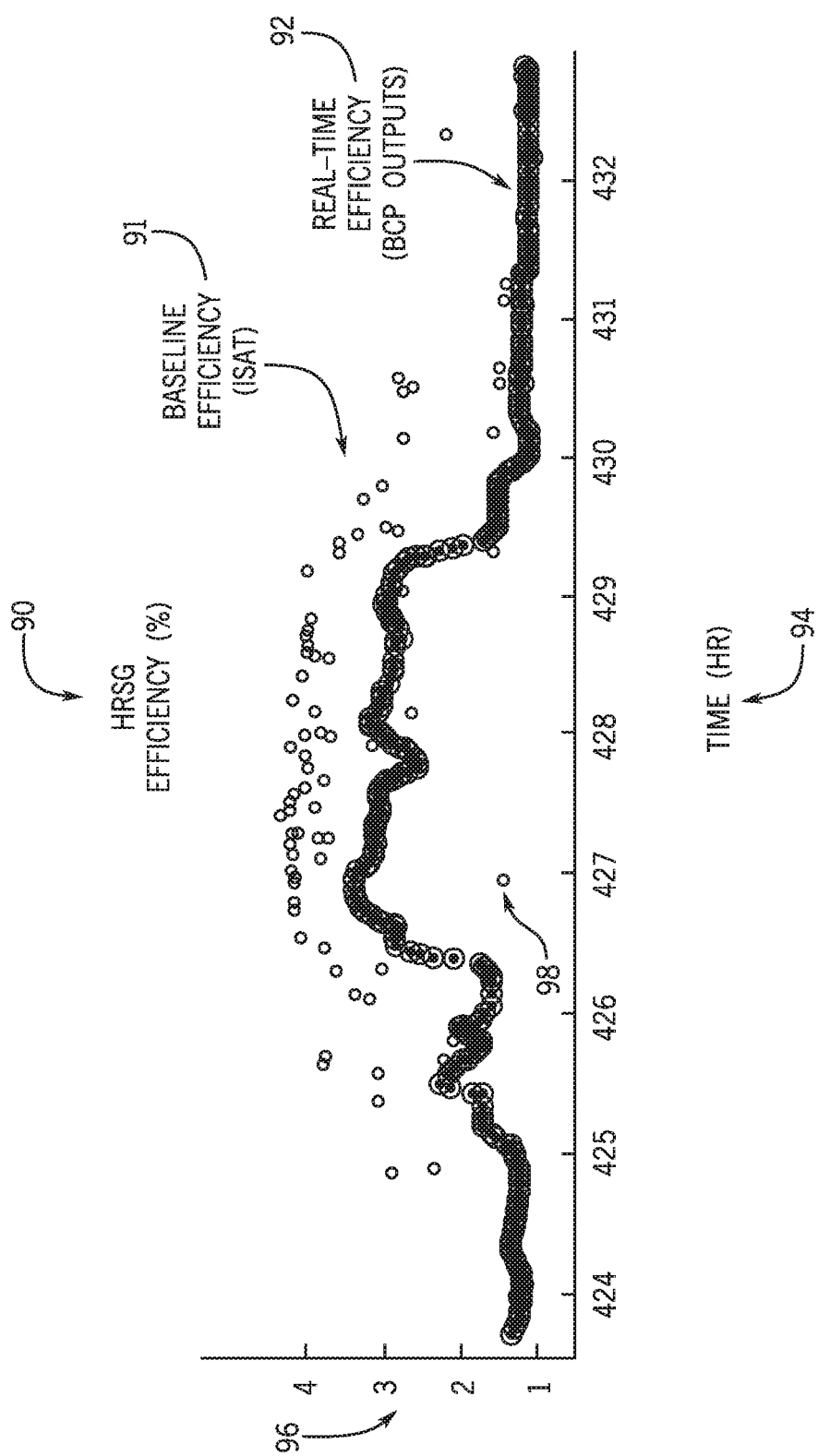
FIG. 3 is a graphical display of one monitored condition of the combined cycle plant (CCPP) and its corresponding efficiencies.

Turning now to FIG. 3, a graphical display of one monitored condition of the combined cycle power plant (CCPP) and its corresponding efficiencies. As stated above, the output conditions of the CCPP 10 of FIG. 1 may include, among other conditions, the efficiencies of the HRSG 18 or the efficiency of the steam turbine 16. In the illustrated embodiment of an HRSG efficiency 90, both the baseline efficiency 91 and the real-time efficiency 92 of the HRSG system are shown on a graph with the independent variable time on the horizontal axis and the dependent variable efficiency on the vertical axis. The HRSG efficiency 90 may include an efficiency of a high pressure portion, a low pressure portion, an intermediate pressure portion, or any combination thereof. Moreover, the units for efficiency on the vertical axis may be any normalized value with varying intervals, and the unit for time on the horizontal axis may be hours (as shown in the illustrated embodiment), minutes, and seconds, among other time units.

Furthermore, the plot includes values for the baseline efficiency 91 are the values that are linearly interpolated to be identified and then outputted by the database of stored plant states 88 as the baseline efficiencies 91 of FIG. 2. In other words, the points that individually make up the baseline efficiency 91 are displayed as individual points because the state is linearly interpolated or added as a new state for each instant of time measurement for the one or more of the operational parameters are taken. The state, when already found to be within a region of accuracy, is outputted as a baseline efficiency 91 from the database of stored states 88 of FIG. 2 and plotted as a point on the plot that make up the baseline efficiency 91 of FIG. 3.

In some embodiments, when a state is received and is not within a region of accuracy, the received state is compared against the BCP outputs (e.g., real time outputs) of the BCP model. If the received state is the same as the BCP output corresponding to that time (e.g., time frame), the value is stored as a new state in the database of stored plant states. As such, the new state is plotted as a point of the baseline efficiency 91 and the real-time efficiency 92 for the instant in time that the state was received.

The processor may also run validity checks. Validity checks may be used to ensure that ISAT does not store (e.g., train) anomalous records. When anomalous records are stored, the database may be automatically or manually updated to replace old erroneous records with new ones. For example, such validity checks may execute their task by examining the inputs in ISAT, and for any record that has a lower component baseline efficiency compared to the real-time efficiency (e.g., BCP output), then the record may be deemed an anomaly improperly stored as a baseline. In that case, the record may be replaced with the updated real-time value indicative of the normal behavior.

Moreover, the algorithm may identify an anomalous baseline efficiency values, similar to baseline efficiency value 98, and remove them from the model because they are significantly lower than the value of corresponding to that instance in time of the real-time efficiency 92 plot. As such, the processor may identify baseline values similar to that of baseline efficiency value 98 and replace the baseline efficiency value 98 at that specific instance in time, in this example at hour 427, with the updated real-time efficiency value at that instance in time.

Furthermore, the plots seen in FIG. 3 may augment the quality control for a component of the CCPP 10 of FIG. 1. Specifically, by observing variations of the real-time efficiency 92 from the stored baseline efficiency 91 (e.g., the difference between the Baseline efficiencies and the real-time efficiencies), the variations may be classified according to the duration of the variation. Specifically, if difference between the baseline efficiency 91 and the real-time efficiency exceeds a predetermined threshold difference value, and if the difference also exceeds a predetermined threshold value of time (e.g., 1 hour), then the variation may be classified as a degradation of the combined cycle. However, if difference between the baseline efficiency 91 and the real-time efficiency 92 exceeds a predetermined threshold difference value, but does not exceed a predetermined threshold value of time, then the inefficiency may be classified as a transient condition or anomaly.

Using the BCP model 84, these variations may be derived and prepared for comparison. For example, efficiencies may be derived from input parameters to enable easy identification by examining a plot of operational conditions. These operational conditions may include various efficiencies. The monitoring system 12 may be used to diagnose an inefficiency by using a plot of efficiency over time to categorize inefficiencies based on duration of the inefficiency (e.g., variation between the baseline efficiency 91 and the real-time efficiency 92).

In additional embodiments, the process of identifying and classifying the inefficiency based on the time duration of the variation between the baseline efficiency and the real-time efficiency 92 may be at least partially automated. Namely, the threshold value of acceptable variations between the real-time efficiency 92 from the baseline efficiency 91 may be predetermined. The memory stores a corresponding value of time for each of the entries in the plot. If consecutive values have a total duration that exceeds a threshold of time duration, this variation set is classified as degradation of the CCPP 10. If consecutive entries vary greater than the threshold for a total duration that does not exceed the threshold value of time, the variation is classified as a transient condition of the CCPP 10.

In additional embodiments of FIG. 1 the monitoring system 12 of the CCPP 10 may display a plot similar to that illustrated in FIG. 3 to highlight inefficiencies and to classify them as degradation or a transient condition. For example, the display 57 of the monitoring system 12 of FIG. 1 may display the identified inefficiencies, and based on the type of inefficiency diagnose which component of the CCPP 10 has malfunctioned. For example, for a plot of the HRSG LP efficiencies, if the real-time efficiency 92 varies more than a predetermined threshold from the baseline efficiency 91 for a longer period of time than an established time threshold, the processor would identify this inefficiency and relay information to the display 57 of FIG. 1. The display 57 may then display a relevant diagnosis. For example, the display 57 may show, among many other possible information displays, "Malfunction in LP evaporator" based on the type of and the component showing the inefficiency.

Figure 4:
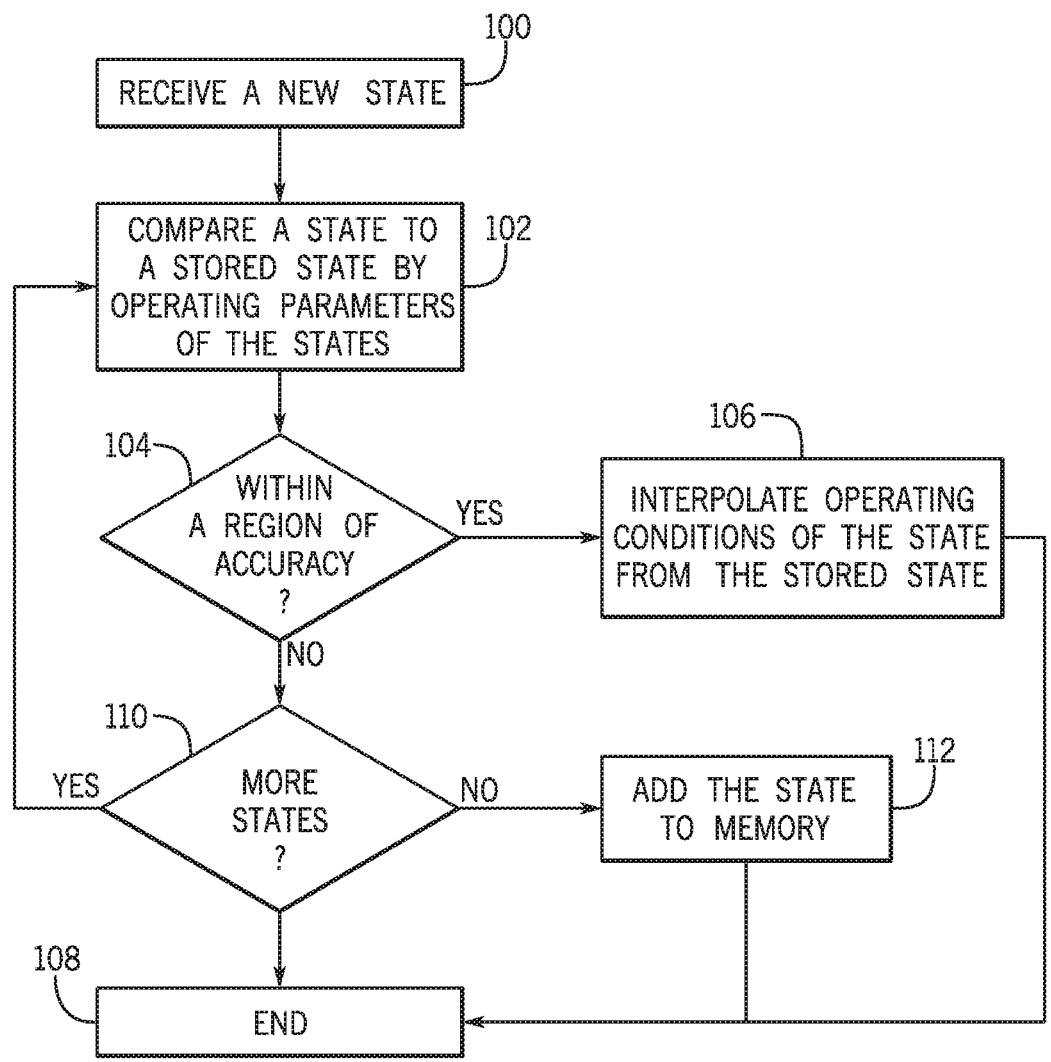
FIG. 4 is a flow diagram of the process performed by the monitoring system in storing states that contain the operational parameters of the combined cycle power plant (CCPP).

Lastly, FIG. 4 is a flow diagram of the process performed by the monitoring system in storing states that contain the operational parameters of the combined cycle power plant (CCPP). More specifically, FIG. 4, shows the process performed by the BCP model 84 and the database of stored states 88, which all occur within the monitoring system 12 of FIG. 1. The process of storing states begins by receiving a new state (block 100). The received state includes input parameters. The input parameters may include independent variables such as, but not limited to, exhaust flow rate over the turbomachinery, gas turbine exhaust temperature, ambient temperature around the turbomachinery, or condenser pressure.

In situ adaptive tabulation (ISAT) builds and/or interprets a map of the distinctive input-output values called states assembled in a database. ISAT is a nonlinear function approximation technique, which divides the search space into multiple linear piecewise regions. In other words, the new state is compared to the database of stored states by linearly interpolating the database of stored state from the new state. The ISAT database of stored states is typically built in a binary tree to enhance the lookup speed of the states received. In additional embodiments, the states may be stored in additional databases.

Once the state is received, the processor compares the state to a stored state by operating parameters of the states (block 102) as discussed in detail above. If there are no stored states in the binary trees of the memory, then a new state is added to the null entries inside the memory because there are no stored states to which the new state may be compared. For example a state containing values for operating conditions exhaust flow rate over the turbomachinery, gas turbine exhaust temperature, ambient temperature around the turbomachinery, and condenser pressure along with its corresponding operating conditions HRSG HP and IP efficiency, HRSG LP efficiency, and steam turbine efficiency could be stored in the database of stored plant states.

Upon comparison of the new state with the stored states (block 102), the operating parameters of the new state are examined to determine whether the operating parameters are within a region of accuracy (block 104). The region of accuracy may be, among other ellipsoid regions, an elliptical region of Euclidean space or a hyper elliptical region of Euclidean space around a vector corresponding to the stored states. If the operating parameters of the new state are within the region of accuracy, then the processor performs linear interpolation (block 106) to find the condition(s) (e.g., baseline efficiencies) corresponding to the state that has been stored in the binary tree of the database of stored states. The database of stored states then adds the stored condition(s) corresponding the stored operating parameters that make up the region of accuracy as a new point on a plot for baseline efficiency similar to the plot of FIG. 3 for the instant in time at which the new operating parameters were measured.

For example, a new state with vector entry values for the following operating parameters: the exhaust flow rate over the turbomachinery, the gas turbine exhaust temperature, the ambient temperature around the turbomachinery, and the condenser pressure, is examined to be within a region of accuracy of the stored states (104). If the operating parameters of the new state are within the region of accuracy of the stored state, the operating condition of the new state is linearly interpolated (block 106) to find the stored condition(s) corresponding to the stored state making up that region of accuracy. Once the new state's condition is linearly interpolated from the stored state (block 106), the process ends (block 108). Once the process ends, a new point corresponding to the instant in time at which measurements were taken is added to the baseline efficiency (e.g., for the HRSG Efficiency) in a plot similar to that of FIG. 3.

On the other hand, if the new state is not within a region of accuracy (block 104) of an entry in a branch of the binary tree (e.g. because the operational parameters of the stored state in a branch of the binary tree do not match), the processor determines whether the new state is within a region of accuracy of the other states stored in other branches of the binary tree (block 110). If there are other states stored in the binary tree, then the processor proceeds down through the binary tree to identify other states and repeats the process for the next state until a compared state (block 102) is sufficiently similar to the new state, and the new state is within the region of accuracy of the stored state. It should be appreciated that while in the current embodiment the entire binary tree is only searched once, in additional embodiments, the binary tree may be searched more than once. In other words, if the stored state, having similar operational parameters to the new state, is not identified and more stored state entries exist, the process proceeds to additional branches of the binary until a state with similar operational parameters to the new state is identified. While the processor searches binary tree for the state with similar operational parameters to the new state, the search space is divided into multiple linear piecewise regions and linear interpolation of the new condition of the new state using the condition of the stored state is performed, if the new state is within a region of accuracy.

If there are no stored states with similar operational parameters to the new state in the branches of binary tree entries and if the new state has a baseline efficiency similar to the real-time efficiency, then the new state is stored as a binary tree entry of the memory 56 (block 112) of the monitoring system 12 of FIG. 1 as a new state in the stored plant states 88 of FIG. 3.

In additional embodiments, a sequential database may be built, where multiple databases with clusters of similar values are used. For example, the sequential database may store in one cluster along the first row state including of similar values for the exhaust flow rate over the turbomachinery, the gas turbine exhaust temperature, the ambient temperature around the turbomachinery, and the condenser pressure, and the operating condition HRSG HP and IP efficiency, the HRSG LP efficiency, and the steam turbine efficiency. In the second row, another cluster may store states with similar values that differ from the first row the exhaust flow rate over the turbomachinery, the gas turbine exhaust temperature, the ambient temperature around the turbomachinery, and the condenser pressure, and the operating condition HRSG HP and IP efficiency, the HRSG LP efficiency, and the steam turbine efficiency. These clusters enable pre-processing to limit which databases to search. Such online clustering algorithm to group such cluster of data into the aforementioned row configurations may include CluStream or D-Stream, and/or other clustering algorithms.

Technical effects of the present disclosure include systems and methods for building efficiency maps of combined cycle power plants. The monitoring system that builds these efficiency maps may receive measurements of the combined cycle power plant and use a model to estimate an efficiency of the combined cycle power plants. The monitoring system may compare the efficiency with prior efficiencies. If the efficiency decreases, the monitoring system may send a signal indicating that a decrease in efficiency of the process has occurred. Further, the monitoring system may identify one or more parts causing the decrease in efficiency and display the one or more parts that have degraded. By identifying the degraded parts, the combined cycle power plant may operate at increased efficiencies.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. Tangible, non-transitory, and computer-readable medium storing instructions thereon that are configured to be executed by a processor of a monitoring system of turbomachinery having a combined cycle, wherein the instructions, when executed, are configured to cause the processor to:

receive a state comprising one or more operational parameters of the turbomachinery;

determine whether the state is within a region of accuracy of a stored record of a stored state stored in memory;

when the state is within the region of accuracy of the stored state, determine one or more operating conditions from the stored record, wherein the one or more operating conditions correspond to one or more efficiencies;

when the state is not within the region of accuracy of the stored state, store the state as a new record in the memory;

classify an inefficiency based at least in part on the one or more efficiencies, wherein classifying the inefficiency comprises determining a duration of a variation of the one or more efficiencies from a baseline efficiency;

when the duration exceeds a threshold duration, classify the variation as a degradation of the combined cycle; and when the duration does not exceed the threshold duration, classify the variation as a transient condition.

2. The tangible, non-transitory, and computer-readable medium of claim 1, wherein determining the one or more operating conditions from the stored record comprises linear interpolation of the one or more operating conditions from the stored state and the state.

3. The tangible, non-transitory, and computer-readable medium of claim 1, wherein the memory comprises one or more binary trees to store a plurality of records, wherein the plurality of records comprises the stored record and one or more additional stored records, and wherein storing the state as the new record comprises referencing the new record as a leaf of a binary tree of the one or more binary trees.

4. The tangible, non-transitory, and computer-readable medium of claim 3, wherein the instructions are configured to pre-process the state to determine which binary tree of the one or more binary trees is to be searched.

5. The tangible, non-transitory, and computer-readable medium of claim 3, wherein the one or more binary trees are generated according to In Situ Adaptive Tabulation (ISAT).

6. The tangible, non-transitory, and computer-readable medium of claim 1, wherein the instructions are configured to cause the processor to determine that the state is not within the region of accuracy of the stored state when the memory includes only null records.

7. The tangible, non-transitory, and computer-readable medium of claim 1, wherein the one or more operational parameters comprise:

an exhaust flow rate through the turbomachinery;

a turbine exhaust temperature for a turbine of the turbomachinery;

an ambient temperature around the turbomachinery;

a condenser pressure for a condenser of the turbomachinery; or any combination thereof.

8. The tangible, non-transitory, and computer-readable medium of claim 1, wherein the one or more efficiencies comprise:

an efficiency of a heat recovery steam generator (HRSG) of the turbomachinery; and an efficiency of a steam turbine of the turbomachinery.

9. The tangible, non-transitory, and computer-readable medium of claim 8, wherein the efficiency of the HRSG comprises:

an efficiency of a high pressure portion of the HRSG;

an efficiency of an intermediate pressure portion of the HRSG;

an efficiency of a low pressure portion of the HRSG; or
any combination thereof.

10. The tangible, non-transitory, and computer-readable medium of claim 1, wherein the region of accuracy comprises an ellipsoid region in Euclidean space around a vector corresponding to the stored record.

11. A turbine system comprising:
a processor; and
memory storing instructions configured to cause the processor to:
receive a state comprising one or more operational parameters of the turbine system;
compare the state to one or more stored states in a binary tree;
for each of the one or more stored states, determine whether the state is within a region of accuracy of a stored record of a respective stored state of the one or more stored states;
when the state is within the region of accuracy of the stored record, interpolate one or more operating conditions for the turbine system from the stored record, wherein the one or more operating conditions correspond to one or more efficiencies;
when the state is not within any respective region of accuracy of the one or more stored states, store the state as a new record;
classify an inefficiency based at least in part on the one or more efficiencies, wherein classifying the inefficiency comprises determining a duration of a variation of the one or more efficiencies from a baseline efficiency;
when the duration exceeds a threshold duration, classify the variation as a degradation; and
when the duration does not exceed the threshold duration, classify the variation as a transient condition.

12. The turbine system of claim 11 comprising a gas turbine, and, wherein the one or more operating parameters indicate performance of the gas turbine.

13. The turbine system of claim 12, wherein the one or more operational parameters comprise:
an exhaust flow rate from the gas turbine;
a turbine exhaust temperature for the gas turbine;
an ambient temperature around a turbomachinery; or
any combination thereof.

14. The turbine system of claim 11 comprising a heat recovery steam generator (HRSG), and wherein the one or more operating conditions indicate performance of the HRSG.

15. The turbine system of claim 14, wherein the one or more operating conditions comprise:
an efficiency of a high pressure portion and intermediate pressure portion of the HRSG of the steam cycle;
an efficiency of a low pressure portion of the HRSG;
an efficiency of a steam turbine of the HRSG; or
any combination thereof.

16. The turbine system of claim 11, wherein the instructions are configured to cause the processor to populate the binary tree using In Situ Adaptive Tabulation (ISAT).

17. A method for monitoring operation of a combined cycle system, wherein the method comprises:
receiving a state of the combined cycle system, wherein the state comprises one or more operational parameters of the combined cycle system;
comparing the state to one or more stored states in a binary tree in memory;
for each of the one or more stored states, determining whether the state is within a region of accuracy of a stored record of a respective stored state of the one or more stored states;
when the state is within the region of accuracy of the stored record, interpolating one or more efficiencies of a steam cycle of the combined cycle system from the stored record;
classifying an inefficiency based at least in part on the one or more efficiencies to determine a variation of the one or more efficiencies from a baseline efficiency and to determine a duration of the variation;
when the duration exceeds a threshold duration, classify the variation as a degradation of the combined cycle; and
when the duration does not exceed the threshold duration, classify the variation as a transient condition.

18. The method of claim 17, comprising displaying the one or more efficiencies, the baseline efficiency, the inefficiency, and a classification of the variation between the one or more efficiencies and the baseline efficiencies.

19. The method of claim 17, comprising searching one or more binary trees storing a plurality of records, wherein each record of the plurality of records is referenced as a leaf of an associated binary tree of the one or more binary trees.

20. The method of claim 17, wherein the one or more binary trees are generated according to In Situ Adaptive Tabulation (ISAT).

* * * * *